(12) United States Patent
Boyer et al.

(10) Patent No.: US 7,121,537 B2
(45) Date of Patent: Oct. 17, 2006

(54) ENCLOSED SPACE FOR MIXING AND DISTRIBUTION OF A GASEOUS PHASE AND A LIQUID PHASE CIRCULATING IN ASCENDING FLOW

(75) Inventors: Christophe Boyer, Charly (FR); Vincent Coupard, Vaulx en Velin (FR); Daniel Svezia, Feyzin (FR)

(73) Assignee: Institut francais du petrole, Rueil-Malmaison Cedex (FR)

( * ) Notice: Subject to any disclaimer, the term of this patent is extended or adjusted under 35 U.S.C. 154(b) by 7 days.

(21) Appl. No.: 10/888,503

(22) Filed: Jul. 12, 2004

(65) Prior Publication Data
US 2005/0051915 A1 Mar. 10, 2005

Related U.S. Application Data

(60) Provisional application No. 60/487,937, filed on Jul. 18, 2003.

(30) Foreign Application Priority Data
Jul. 10, 2003 (FR) .................................. 03 02158

(51) Int. Cl.
*B01F 3/04* (2006.01)
*B01J 8/22* (2006.01)

(52) U.S. Cl. .......................... 261/96; 261/97; 261/110; 422/220

(58) Field of Classification Search ................. 261/96, 261/97, 109, 110; 422/220
See application file for complete search history.

(56) References Cited

U.S. PATENT DOCUMENTS

| | | | | |
|---|---|---|---|---|
| 3,197,286 A | * | 7/1965 | Farkas et al. | 422/140 |
| 3,446,489 A | * | 5/1969 | Leva | 261/97 |
| 4,140,625 A | * | 2/1979 | Jensen | 208/146 |
| 5,958,220 A | * | 9/1999 | Reynolds et al. | 208/108 |
| 6,093,373 A | * | 7/2000 | Darmancier et al. | 422/220 |
| 6,123,323 A | * | 9/2000 | Yoneda et al. | 261/96 |
| 6,613,219 B1 | * | 9/2003 | Harter et al. | 208/146 |

* cited by examiner

*Primary Examiner*—Scott Bushey

(57) ABSTRACT

Described is an enclosed space, a column, or a reactor including a device for mixing and distribution of at least one gaseous phase and at least one liquid phase. The device can be placed upstream of a reaction zone or of a gas/liquid contact zone that can contain a packing bed or a bed of solid, possibly catalytic, particles. Also described is a process for implementing such an enclosed space, column or reactor and to a process for fabricating such an enclosed space, column or reactor.

12 Claims, 5 Drawing Sheets

Figure 4:
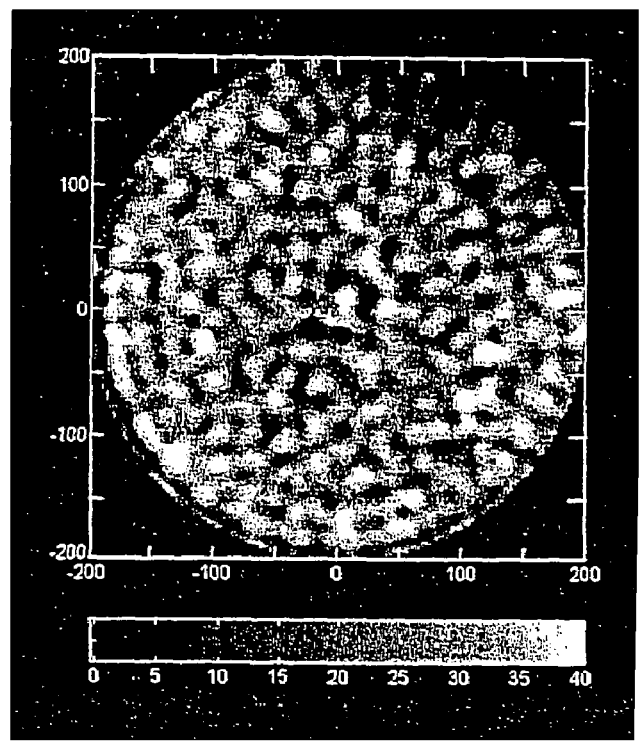
Figure 4:
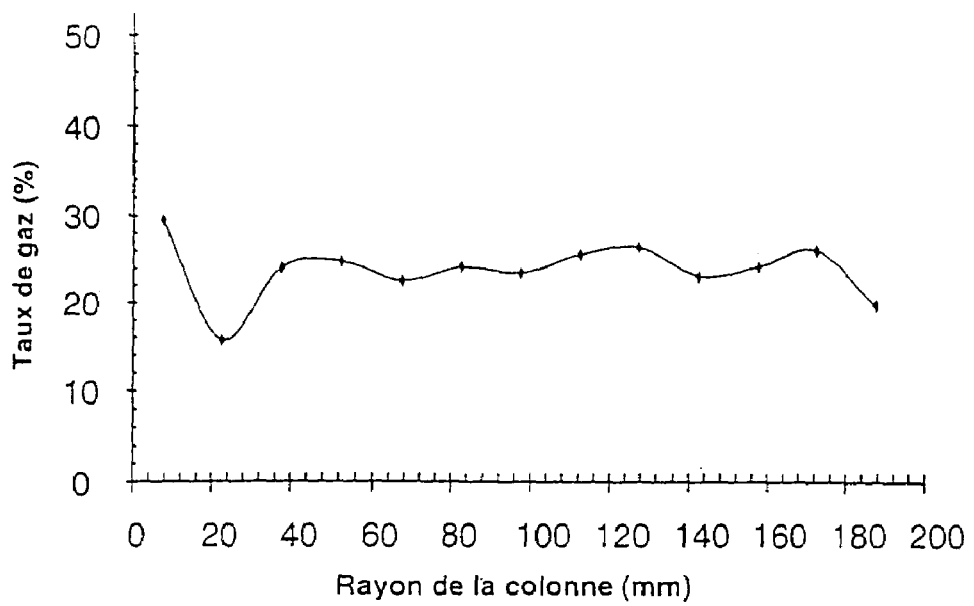

Fig.4a) Image 2D du taux de gaz dans le lit

Fig. 4b) Profil radial de taux de gaz dans le lit

Figure 5:
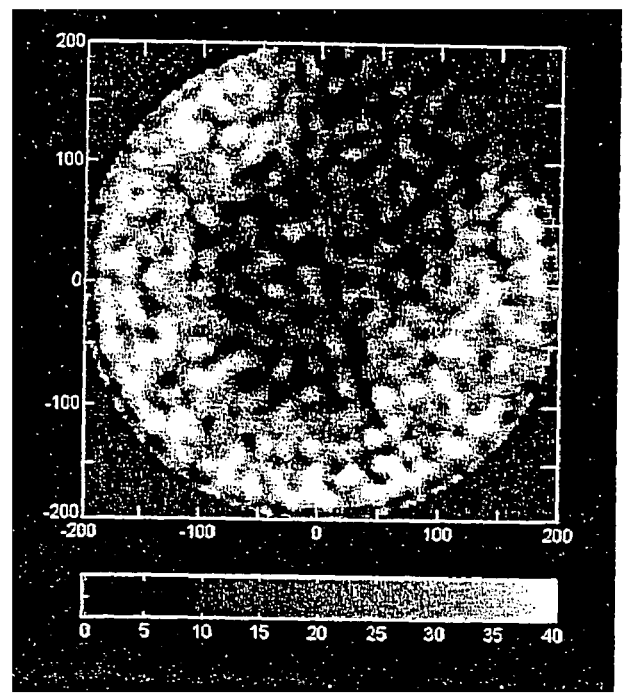
Figure 5:
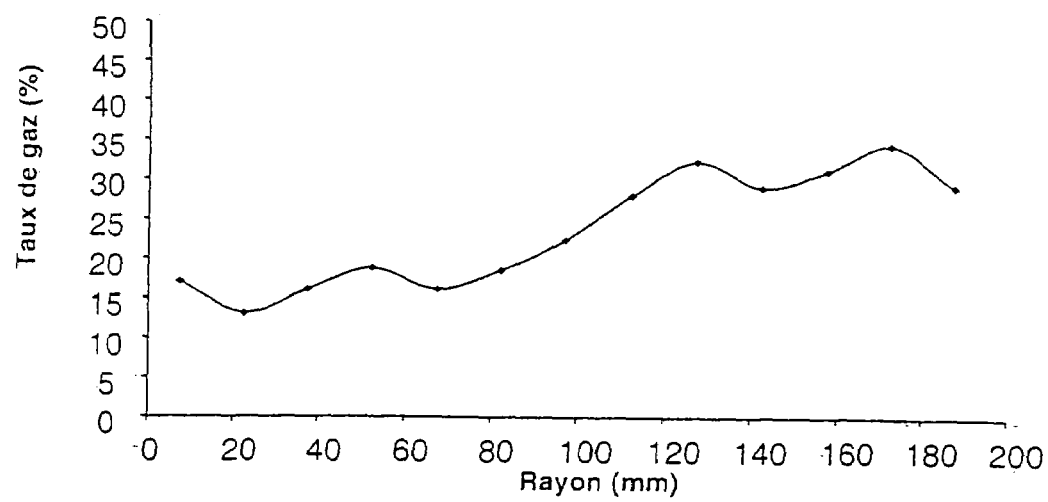

Fig. 5a) Image 2D du taux de gaz dans le lit

Fig. 5b) Profil radial de taux de gaz dans le lit

ENCLOSED SPACE FOR MIXING AND DISTRIBUTION OF A GASEOUS PHASE AND A LIQUID PHASE CIRCULATING IN ASCENDING FLOW

This application claims the benefit of the filing date of U.S. Provisional Application Ser. No. 60/487,937 filed Jul. 18, 2003 and claims priority to PCT/FR03/2158 filed Jul. 10, 2003.

This invention relates to an enclosed space, a column, or a reactor comprising a device for mixing and distribution of at least one gaseous phase and at least one liquid phase, said device being placed upstream of a reaction zone or of a gas/liquid contact zone and it can comprise a packing bed or a bed of solid, possibly catalytic, particles. This invention also relates to a process for implementing such an enclosed space and to a process for fabricating such an enclosed space.

Numerous devices, often called distributor plates, whose object is to obtain an approximately uniform distribution of a gaseous phase and a liquid phase over the entire cross section of an enclosed space, most often cylindrical in shape, are known. The applications of such devices are numerous. For example, these distributor plates can be placed, in the direction of circulation of the fluids, upstream of reaction zones or catalytic zones in which the catalyst is most often in the form of solid particles (balls, extrudates, grains of various shapes . . . ), placed in a fixed bed or in a boiling bed. By way of example, applications of such devices in hydrogenation or hydrotreatment functioning with ascending flow of gas and liquid, in reactors for conversion of residues of heavy crude oils or of carbon in a fluidized bed, triphase in which the solid phase (suspensions of carbon or catalyst) is kept boiling by the gas in liquid, can be mentioned.

According to other applications, the gas/liquid distributor plates can be placed upstream from a packing bed structured, for example, in the area of washing with a basic liquid of acidic gases.

Some of these devices also provide for the approximately homogeneous mixing of gaseous and liquid phase(s) over the entire cross section of the enclosed space, before its entry into the bed of particles or packing.

More particularly, U.S. Pat. No. 6,123,323 proposes a distribution system with ascending flow in a reactor fed by a mixture of liquid and gas. The system is composed of plates occupying all or part of the total cross section of the reactor, delimiting a volume in which the gas and the liquid will be separated from each other. The gas then flows through orifices spread over the cross section of the plate. The liquid itself flows separately through tubes going through the plate and extending below the liquid/gas interface or through fractions of the cross section of the reactor that are not covered by the plate. The system is constantly fed by a liquid/gas flow. Thus the gas reaches the separation zone located upstream from the distributor plate in the form of gas bubbles or pockets. The release of the gas will thus create significant perturbations that can induce pulsations in the flow and cause local disequilibrium of the gas distribution. The system does not make it possible further to optimize the gas/liquid contact because the liquid circulates separately from the gas and consequently can pass through the reactor without encountering the latter.

U.S. Pat. No. 5,958,220 describes a distributor placed in a reactor for hydrotreatment of a hydrocarbon, fed in ascending flow with co-currents of gas and liquid through a single point of introduction of the two fluids that have been mixed in advance. The system is composed of a plate covering the entire cross section of the reactor, said plate being perforated and connected to a series of tubes extending toward the bottom of the reactor, said tubes providing for movement of fluid between the upstream and downstream of said plate. This plate creates an upstream zone in which the gas is released from the liquid. The released gas then flows through orifices located on the tubes above the gas/liquid separation interface. The gas/liquid mixture, and the gas present in the release zone, flow through the tubes. The system thus makes it possible finally to inject a gas/liquid mixture over the entire section of the reactor, downstream from the distributor plate and at the inlet to the catalytic bed. However, such a construction necessarily creates interface fluctuations upstream from the gas/liquid distributor, because of the inevitable release of the gas. The gas flows in an approximately vertical direction in the reactor, the bubbles having about the same trajectory will coalesce and rapidly create gas pockets that will be released, causing significant fluctuations in the gas/liquid separation interface. These perturbations will cause pulsations in the gas flow and can destabilize the radial distribution of the gas by plunging some of the gaseous orifices into liquid.

Patent WO 00/61706 offers a distribution system based on the same principle as that described in U.S. Pat. No. 5,958,220. A quenching system, placed upstream from the distributor tubes and thus below the gas/liquid interface, is added to introduce a cold gas into the reactor while the distributor is used between two successive reaction zones. This system can furthermore make it possible to stagger the hydrogen throughput along the reactor when the former is used as a quenching gas. Here again, the injected gas, because of coalescence of bubbles, will lead to oscillations that can cause local deterioration of the distribution of the gas/liquid flow, This invention relates to an enclosed space or a reactor comprising at least one bed of packing or of particles, possibly catalytic, means of introducing a liquid phase and means of introducing a gaseous phase, means of circulating, by ascending co-current, the liquid and gaseous phases and at least one distribution system or distributor plate comprising a planar plate occupying the entire cross section of the enclosed space, hollow tubes that are open at each of their ends, said tubes being connected to the planar plate and piercing the latter so as to make possible the circulation of fluids between the upstream and downstream of said plate, at least one orifice placed on the lateral wall of each tube, said means of introducing the liquid phase being placed in the enclosed space upstream from the distributor plate and said means of introducing the gaseous phase being placed in the enclosed space below the planar plate, at a level making it possible to form, while operating, a gas retention space under the plate as well as a liquid/gas interface located below at least one of said orifices located on each tube, below the means of introducing the gaseous phase and above the lower end of said tubes.

Preferably, the orifice or orifices will be located on the tubes at the same height(s), i.e., each of the tubes will be pierced by construction of an orifice placed at an identical and predetermined height, it being understood that each tube can be pierced in the direction of its length by a series of orifices.

For example, said enclosed space or said reactor comprises a distribution system placed upstream from the first catalytic bed.

Advantageously, said enclosed space or said reactor comprises in this case a means of spreading the flow of liquid over the cross section of the enclosed space, placed upstream from the distribution system.

Said enclosed space or said reactor can further comprise a distribution system placed between two successive catalytic beds.

Preferably, said enclosed space or said reactor can then further comprise means of separating the residual gas coming from the first bed, placed upstream from the distribution system.

Said separation means comprise, for example, a plate occupying a fraction of the cross section of the enclosed space and an annular, perforated wall attached to the periphery of said plate, said wall delimiting, within the enclosed space, a central space in which the tubes are located and a peripheral space that has no tubes.

According to possible embodiments of the invention, the means of introducing the gaseous phase comprise at least one elbow tube and/or at least one horizontal, perforated tube.

In general, the density of the tubes in a distributor plate is between about 50 tubes/m$^2$ and about 1500 tubes/m$^2$.

The diameter of the tubes is most often between about 10 mm and about 200 mm.

The invention also relates to a process for mixing and distribution of a liquid phase and a gaseous phase within an enclosed space or a reactor in which the following steps are performed:

a) The liquid phase is introduced into an enclosed space upstream from a distributor plate comprising a planar plate occupying the entire transverse section of the enclosed space, the tubes being hollow and open at each of their ends, said tubes being connected to the planar plate and piercing the latter so as to make possible the circulation of fluids between the upstream and downstream of said plate and at least one orifice placed on each tube, b) The gaseous phase is introduced into the enclosed space at the level of the distributor plate, c) The gas and/or liquid throughputs are regulated so as to establish, under the plate, a gas retention space into which the gaseous phase is introduced, as well as a liquid/gas interface located below at least one of said orifices and above the lower end of said tubes, d) The gas/liquid mixture coming from step c) is introduced into a bed of particles, possibly catalytic, or a packing bed:

Advantageously, the throughput of the gaseous phase is between $5\times10^{-4}$ kg/m$^2$·s and 10 kg/m$^2$·s and the throughput of the liquid phase is between 0 and 100 kg/m$^2$·s.

Finally, the invention relates to a process for fabricating an enclosed space such as described above in which the number of orifices present on the tubes and/or the arrangement of the orifices present on the tubes and/or the size of the orifices present on the tubes and/or the diameter of the tubes and/or the length of the tubes is adjusted as a function of minimum and maximum values of the throughput of the gaseous phase and of the liquid phase during operation of said enclosed space.

For example, one skilled in the art will adapt at least one of the above structural characteristics so as to adjust, according to known principles, the value of the gas retention space and consequently the position of the liquid/gas interface.

This invention notably makes it possible to obtain, at the inlet to the bed of particles or packing, an intimate mixture of gas and liquid, i.e., an environment composed of a continuous liquid phase in which the gaseous phase is dispersed in the form of bubbles of very small diameter.

It further makes possible a homogeneous distribution of the liquid/gas mixture over the entire cross section of the column, at the inlet to the bed.

Further, this invention makes it possible to resolve the problems of the prior art such as explained above by efficient control of the fluctuations and of the inherent flatness of the liquid/gas interface upstream from the distributor plate.

Finally, the proposed system makes possible an increasing flexibility, i.e., operation over a wide range of gas or liquid throughput. Indeed, the distribution of several orifices along the tubes makes it possible to vary the gas throughput from 1 to 3, even 1 to 5, in a range of liquid throughput between about $5\times10^{-4}$ kg/m$^2$·s and 10 kg/m$^2$·s, while retaining homogeneous operation even when the gas/liquid interface is located near the orifices, since the former practically does not fluctuate at all. Likewise, the diameters of the tubes being sized to create low feedstock loss of the liquid flow when it goes through the distributor plate, the system makes possible a very wide range of operation for liquid throughput, most often between 0 and 100 kg/m$^2$·s, 0 excluded, preferably between 0 and 25 kg/m$^2$·s, 0 excluded, without causing significant variations in the level of gas retention.

Figure 1:
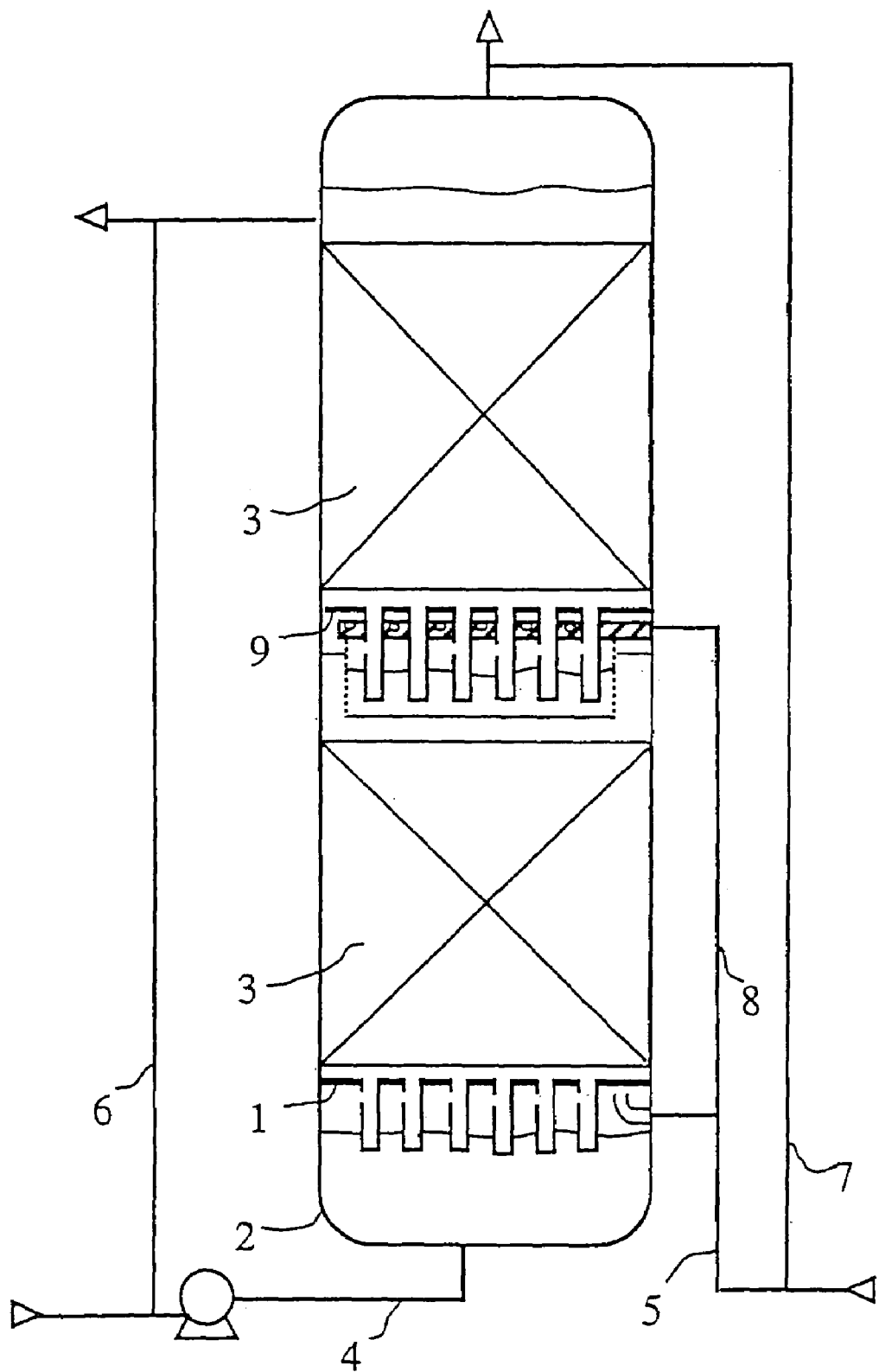
Figure 2:
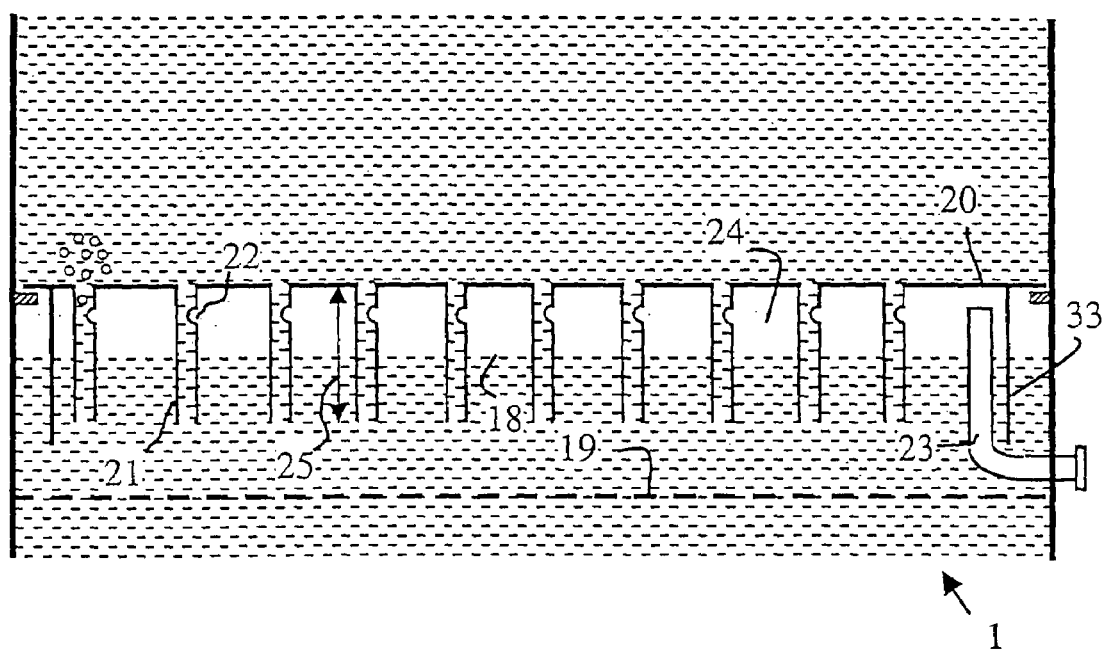
Figure 3:
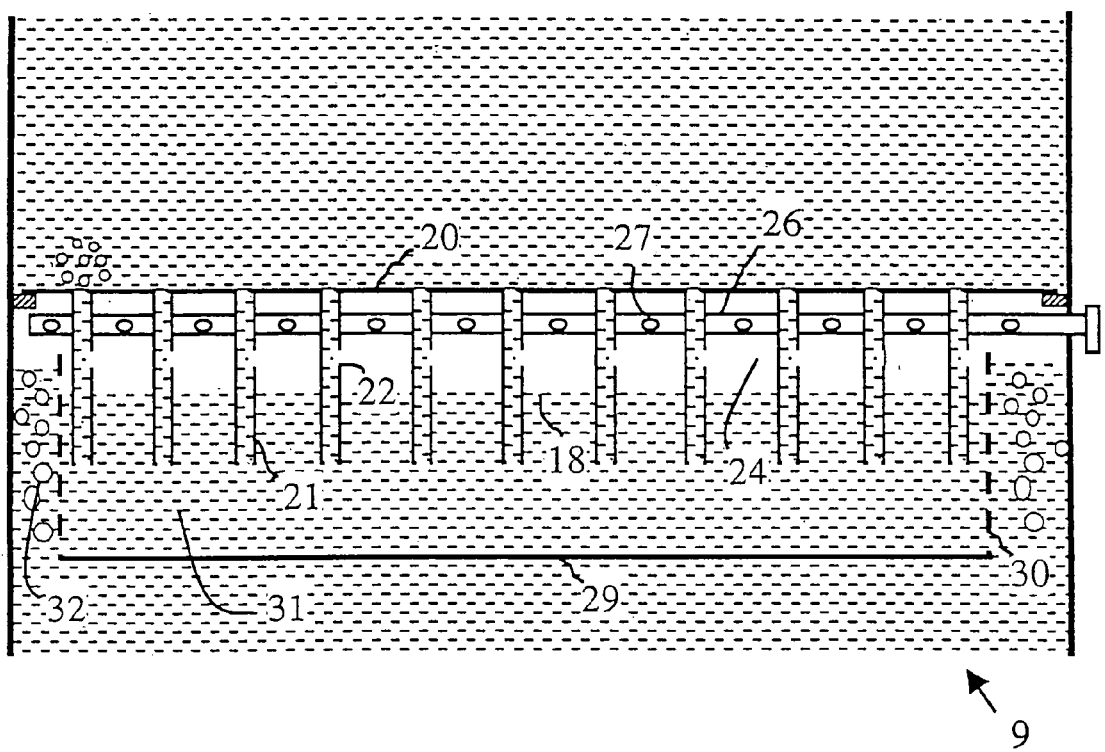

To facilitate comprehension of the invention, FIGS. 1 to 3 show nonlimiting embodiments of a device for mixing and distribution according to the invention placed in an enclosed space or column upstream from a fixed catalytic bed and operating with ascending, co-current liquid/gas flow.

In particular,

FIG. 1 relates to the description of an overall unit comprising a reactor according to the invention in which this distributor plate can typically be used, either upstream from the first catalytic bed, or between two successive catalytic beds, FIG. 2 illustrates the embodiment of the invention in which the distributor plate is placed upstream from the first bed, i.e., below the reactor, FIG. 3 illustrates another embodiment in which the distributor plate is placed between two successive catalytic beds within the reactor, FIGS. 4a and 4b show the results from the distribution system of Example 1, FIGS. 5a and 5b show the results from the distribution system of Example 2.

The system according to this invention makes it possible to distribute and mix a flow of gas and liquid in a reactor operating with ascending fluid flow. The reaction can require the presence and the placing in contact of a gas/liquid mixture or of a gas/liquid/solid mixture when it involves a catalytic reaction. In the latter case, the catalyst can be kept immobile in the reactor or be kept bubbling by the gas/liquid flow. With reference to FIG. 1, a distribution system 1 can be installed at the inlet to reactor 2 upstream from a reaction zone and/or between two reaction zones 3.

When it is located in the bottom part of the reactor, the distribution system is fed in part by a line 4 with liquid feedstock and by a line 5 with gaseous feedstock. The liquid circulating in line 4 can be some of the untreated liquid feedstock or a mixture of untreated liquid feedstock and partially treated product, reinjected after recycling by line 6. Likewise, the gaseous feedstock can comprise a mixture containing pure hydrogen or a mixture containing pure hydrogen as well as residual hydrogen and vaporized hydrocarbons recovered at the head of the reactor and reinjected at the inlet of the reactor by lines 7 and 5. In all cases, the injection of the gas flow is completely separate from the injection of the liquid flow at the distribution system. When distribution system 9 is located between two reaction zones, it is fed in part by the liquid flow coming from the first reaction zone, optionally after separation of the residual gas as will be explained below, and in part by a separate injection of gaseous feedstock. The gaseous feedstock injected by line 8 can be a mixture containing pure hydrogen or a mixture containing pure hydrogen, residual hydrogen, and vaporized hydrocarbons recovered at the head of the reactor and reinjected into the reactor at an intermediate level by lines 7, 5, then 8.

FIG. 2 illustrates implementation of this distribution plate (or distributor) at the inlet of a reactor and upstream from a first reaction zone. The distributor consists of a planar plate 20 occupying the entire cross section of the reactor. This plate is connected to vertical tubes 21 that pierce it, thus making it possible for gaseous and liquid fluids to pass through the distribution plate. The distribution system thus consists of a series of vertical tubes that pass through a plate occupying the entire cross section of the reactor. These tubes have a lateral cross section for passage in the form of one or more orifices 22 that can be of any shape (circular, elliptical, or any other shape). The number, arrangement, and size of orifices 22 for each tube 21 will be selected notably according to any technology known to one skilled in the art as a function of the minimum and maximum operating values of the gaseous throughput so that, no matter the operating range of gaseous throughput, the loss of pressure to which the gas is subjected when it passes through orifices 22 causes the formation of a gas retention space 24 under plate 20 and of a liquid/gas interface 18 located below at least one of orifices 22, even below the lowest level of orifices 22. In a nonlimiting way, an orifice or cross section of lateral passage will be discussed below in the description, it being understood that said cross sections correspond to the entire passage surface of the gas generated by all the orifices located on a shaft. To prevent escape of gas at the point Where the plate is attached, a circular wall 33, placed between plate 20 and the lateral wall of the reactor and extending beyond the lower end of hollow tubes 21 can advantageously be welded in an airtight fashion to said plate 20. Wall 33 delimits in this way the central zone of the reactor where tubes 21 are located and prevents a possible depressurization of retention zone 24 due to possibly escaping gas.

When it is located at the inlet of the reactor, the distributor is fed separately by the liquid phase and by the gaseous phase, respectively by lines 5 and 4 (FIG. 1). The liquid phase is injected at the bottom part of the reactor. Advantageously, and notably in the case where a high throughput of liquid is introduced by line 4, a screen 19 (FIG. 2) is placed downstream from the point of introduction of the liquid feedstock, so that the liquid streams are spread homogeneously over the entire cross section of the reactor at the inlet of the distributor. Of course, any other equivalent means for spreading the liquid flow will be able to be placed upstream from the distributor without exceeding the scope of the invention.

The gaseous phase is injected through the lateral wall of the reactor with the help of one or more tubes whose cross section for exiting gas is located above liquid/gas interface 18 and preferably above the upper orifice of the lateral cross section for passage of the vertical tubes. These tubes can, for example, be present in the form of an elbow tube 23, such as shown in FIG. 2, or in the form of a perforated horizontal tube 26, to distribute the gas throughput over the largest cross section, as shown in FIG. 3. If a wall 33 is installed, tube 23 empties into the central space delimited by wall 33 and containing traversing tubes 21. The gas then flows through orifice(s) 22 located on each vertical tube 21 and mixes, inside the latter, with the ascending liquid flow. According to the invention, liquid/gas interface 18 is always located below at least one of orifices 22 and always above the lowest level of the tubes. The injection of gas and liquid being separate, there is no release of gas bubbles at the gas/liquid interface, contrary to the device described in U.S. Pat. No. 5,958,220. Thus this interface 18 is advantageously kept approximately planar and horizontal, which promotes an approximately homogeneous supply of liquid flow and gas flow for all the tubes, while preventing fluctuations in interface 18 due to release of bubbles or pockets of gas. Each tube 21 further plays a role as a gas/liquid mixer, because the entire liquid flow mixes with the entire gas flow inside the tubes. Advantageously, the size of orifices 22 for each cross section for passage of liquid and gas at the tubes makes it possible to control the respective speeds of the two fluids and to optimize the shearing of the gas jets by the liquid to increase the gas/liquid contact surface area. Internal materials (of the structured packing, metallic foam type) can also be inserted to increase the gas/liquid contact area inside tubes 21. Finally, the system of this invention makes it possible simultaneously to mix the gas and liquid flows and to distribute them homogeneously over the entire cross section of the reactor.

A homogeneous distribution of the mixture requires a minimum density of tubes. The number of tubes is generally between about 50 and about 1500 tubes/$m^2$ and preferably between about 100 and about 1000 tubes/$m^2$. The tube density generally is selected as a function of the injection density of the gas/liquid mixture. The liquid passes through the vertical tubes in the direction of their axis. These vertical tubes have one or more openings or orifices 22 on the lateral wall intended for the passage of the gas. These lateral openings can preferably be orifices of circular or elliptical shape or rectangular slits. As described above, the total surface area of each cross section of passage will generally be calculated so that the loss of pressure to which the gas is subjected causes the formation of a gas retention zone 24 upstream from these orifices. In this way, gas/liquid interface 18 will be established below at least one of orifices 22, preventing the passage of liquid through said orifices. The diameter of the tubes and the dimensions of the orifices will be calculated so that, for the desired ranges of liquid and gas throughputs, the gas/liquid interface will be located below the lower level of the cross section of the lateral passages and above the inlet of the vertical tubes. The diameter of the vertical tubes is most often calculated to minimize the loss of liquid feedstock when it goes through the distributor plate. This diameter is generally between about 10 and about 200 mm, and preferably between about 20 and about 100 mm. The diameter of the orifices or the width of the slits will generally be less than 75% of the diameter of the tubes. The level of this gas retention is generally between about 10 and about 1000 mm and preferably between about 50 and about 500 mm. Total height 25 of tubes 21 will often be greater by at least 80 mm, even 100 mm, than the sum of the maximum level of gas retention volume and of the height located between plate 20 and the upper orifice of the lateral cross sections of passage. This height range generally makes it possible to have a ratio of at least 3 between the minimum gas throughput and the maximum gas throughput to be distributed. This way, liquid/gas interface 18 establishes itself above the lower level of vertical tubes 21, which because of this are fed exclusively by liquid in the lower part. The separate injection of gas and liquid fluids at the vertical tubes makes it possible to control a homogeneous supply of liquid and gas to the tubes. In this way, the gas/liquid interface is not perturbed by the release by coalescence of gas bubbles and stays approximately horizontal. All of orifices 22 are thus permanently fed only by the gas and all of tubes 21 are permanently fed only by liquid. The gas will pass through slits or orifices 22 and mix intimately with the liquid, i.e., in the form of fine droplets dispersed homogeneously in the liquid flow. The injection speed of the gas will generally be between about 10 cm/s and about 200 m/s and preferably between about 1 m/s and about 100 m/s. Increasing the speed of the gaseous jet promotes fragmentation of the bubbles and thus gas/liquid contact. To increase the gas/liquid contact further, internal parts can be inserted into vertical tubes 21. These internal parts can be structured packing or metallic foams. Each tube then plays the role of a static mixer. The distribution system thus makes it possible simultaneously to mix and distribute the gas and liquid flow. Indeed, the entire liquid flow is in contact with the entire gaseous flow before passing through the reaction zone downstream from the distributor plate.

FIG. 3 gives an example of an embodiment of the distributor plate when the latter is placed between two successive reaction zones. The distributor consists of a planar plate 20 occupying the entire cross section of the reactor. This plate has vertical tubes 21 passing through it that are intended for the passage of the liquid/gas mixture. The liquid passes through the vertical tubes in the direction of their axis. These vertical tubes have one or several openings or orifices 22 on the lateral wall intended for the passage of the gas. These lateral openings can be orifices in a circular or elliptical shape or rectangular slits. According to the preceding description, made with reference to FIG. 2, the diameter of the tubes and the cross sections of passage left for the gas are calculated so that, no matter which areas are used for liquid and gas throughput during operation, gas/liquid interface 18 is located below at least one of orifices 22 and above the inlet to vertical tubes 21. The characteristics of the tubes (number, height, diameter . . . ) are the same as those described in FIG. 2. Some gas is injected at the distributor plate through a perforated horizontal tube 26 connected to conduit 8 (FIG. 1). This gas can be a cooling gas or an extra bit of hydrogen for the reaction being performed in the reaction zone located downstream from the distributor. Horizontal tube 26 is located above liquid/gas interface 18 and is advantageously located between the upper level of the upper orifice of the lateral cross sections for passage and plate 20. This tube is pierced by orifices 27 of any shape (for example circular, elliptical, rectangular) that are intended to spread the secondary gas in an approximately homogeneous way over the entirety of gas retention space 24 and thus to promote mixing of the primary gas coming from the first reaction zone and the secondary gas. To prevent the release of the primary gas from creating perturbations of gas/liquid interface 18, a gas release system is added. It consists of an approximately planar plate 29 that occupies a fraction of the cross section of the reactor and of an annular perforated wall 30 placed on the periphery of planar plate 29. Wall 30 delimits, in the reactor, a central space 31 in which all vertical tubes 21 are located and a peripheral space 32 in which there are no tubes 21. Plate 29 diverts the gas/liquid flow coming from the first reaction zone toward peripheral zone 32. In zone 32, all the gas is released and rejoins gas retention zone 31. The liquid passes through perforated wall 30. The size and number of orifices of wall 30 are generally calculated so that the speed of the liquid through these orifices will be at least 10 times less than the ascending speed of the gas bubbles. The height of wall 30 is calculated according to conventional techniques so that, for maximum operating gas and liquid throughputs, the liquid level will not be higher than the upper end of wall 30. In this way, there is no risk of the liquid overflowing over wall 30 and consequently no risk of perturbations in gas/liquid interface 18.

The following examples make it possible to illustrate the advantages of this invention, without in any way limiting its scope.

EXAMPLE 1 (according to the invention)

A distribution system according to the invention was tested at the inlet to a column 400 mm in diameter with ascending liquid and gas flow according to principles described with reference to FIGS. 1 and 2. The system is placed upstream from a catalytic bed. The tube density is 150 tubes/m$^2$. These tubes are 15 mm in diameter and 400 mm in height. A single circular orifice 22 with a diameter of 1 mm is located on each tube at a distance of 10 mm from plate 20 for passage of the gas. The liquid stream introduced at the bottom of the reactor is 3.5 kg/m$^2$·s and the gas stream is 0.018 kg/m$^2$·s. The gas injection at the level of the distributor is done with the help of a single tube emptying into the gas retention zone thus formed above orifices 22. Under these conditions, calculations of the volume of retention zone 24, based on the values of the gas feedstock loss at the orifices and the liquid feedstock loss upon passage through the plate, make it possible to define a distance between plate 20 and the liquid/gas interface of 303 mm. Two sensors of the optical probe type show that the liquid/gas interface is separated under these conditions from plate 20 by a value between 250 mm and 330 mm. An image of the distribution of the gas ratios is obtained with the aid of a tomographic system with gamma rays. This image, represented in FIG. 4a, is acquired 1 m downstream from the inlet to the bed. The range (in shades of grey) goes from black for a zero gas ratio, i.e., practically no gas in the mixture, to white for a gas ratio near 40% in the gas/liquid mixture. As it can be established, the distribution of the gas ratio is very homogeneous over the entire cross section of the column. FIG. 4b shows a radial profile of the gas ratio averaged over all the angular positions.

EXAMPLE 2 (comparative)

The device used was the same as that used in the preceding example. The only difference involves the introduction of gas throughput that is injected upstream from the plate in the direction of circulation of the fluids, i.e., mixed with the liquid phase at the lower end of the reactor. The operating conditions are the same as those of example 1. FIG. 5a shows an image of the distribution of the gas ratio obtained in this case over the entire cross section of the reactor. FIG. 5b shows the corresponding radial profile of the gas ratio. As it can be established, a significant portion of the cross section of the bed (about 50%) is not irrigated correctly by the gas flow. In fact, the radial profile of the gas ratio is much less homogeneous than that obtained in the configuration corresponding to this invention.

The invention claimed is:
1. Enclosed space or reactor (2) comprising: at least one packing bed or optionally catalytic particle bed (3), means of introducing a liquid phase (4) and means of introducing a gaseous phase (5), means of circulating the liquid and gaseous phases as ascending co-currents, and at least one distribution system or distributor plate (1, 9) comprising a planar plate (20) occupying the entire cross section of the enclosed space or reactor, hollow tubes (21), open at each of their ends, said tubes being connected to planar plate (20) and piercing the latter so as to make possible the circulation of fluids between the upstream and downstream of said plate, at least one orifice (22) located on the lateral wall of each tube (21), said means of introducing liquid phase (4) being placed in enclosed space or reactor (2) upstream from distributor plate (1, 9) and said means of introducing gaseous phase (5) being placed in enclosed space or reactor (2) below planar plate (20), at a level making possible, during operation, the formation of a gas retention space (24) under plate (20) and the formation of a liquid/gas interface (18) located below at least one of said orifices (22) present on each tube (21), below the means of introducing gaseous phase (5) and above the lower end of said tubes (21).

2. Enclosed space or reactor according to claim 1, comprising a distribution system (1) located upstream from the at least one packing bed or optionally catalytic particle bed.

3. Enclosed space or reactor according to claim 2, comprising a means (19) of distributing the liquid flow over the cross section of the enclosed space or reactor, placed upstream from distribution system (1).

4. Enclosed space or reactor according to claim 1, further comprising a distribution system (9) placed between two successive catalytic beds.

5. Enclosed space or reactor according to claim 4, further comprising means of separating the residual gas coming from the first of the two successive catalytic beds, located upstream from distribution system (9).

6. Enclosed space or reactor according to claim 5, in which said separation means comprise a plate (29) occupying a fraction of the cross section of the enclosed space or reactor and a perforated, annular wall (30) attached to the periphery of said plate (29), said wall (30) delimiting, in the enclosed space or reactor, a central space (31) in which tubes (21) and a peripheral space (32) without tubes (21) are located.

7. Enclosed space or reactor according to claim 1, in which the means of introducing the gaseous phase comprise at least one elbow tube (23) and/or at least one perforated horizontal tube (26).

8. Enclosed space or reactor according to claim 1, in which the tube density in a distributor plate is between about 50 tubes m$^2$ and about 1500 tubes/m$^2$.

9. Enclosed space or reactor according to claim 1, in which the diameter of tubes (21) is between about 10 mm and about 200 mm.

10. Process of mixing and distributing a liquid phase and a gaseous phase within an enclosed space or a reactor according to claim 1, in which the following steps are performed: a) the liquid phase is introduced into the enclosed space or reactor upstream from a distributor plate comprising a planar plate occupying the entire transverse section of the enclosed space or reactor, the tubes being hollow and open at each of their ends, said tubes being connected to the planar plate and piercing the latter so as to make possible the circulation of fluids between the upstream and downstream of said plate and at least one orifice placed on each tube, b) the gaseous phase is introduced into the enclosed space or reactor at the level of the distributor plate, c) the gas and/or liquid throughputs are regulated so as to establish, under the plate, a gas retention space into which the gaseous phase is introduced, as well as a liquid/gas interface located below at least one of said orifices and above the lower end of said tubes, d) the gas/liquid mixture coming from step c) is introduced into a bed of particles, optionally catalytic, or a packing bed.

11. Process according to claim 10, in which the throughput of the gaseous phase is between $5 \times 10^{-4}$ kg/m$^2 \cdot$s and 10 kg/m$^2 \cdot$s and in which the throughput of the liquid phase is between 0 and 100 kg/m$^2 \cdot$s.

12. Process of fabricating an enclosed space or reactor according to claim 1, in which the number of orifices present on the tubes and/or the arrangement of the orifices present on the tubes and/or the size of the orifices present on the tubes and/or the diameter of the tubes and/or the length of the tubes are adjusted depending on the minimum and maximum values of the throughput of the gaseous phase and of the liquid phase during operation of said enclosed space or reactor.

* * * * *